(12) United States Patent
Roll et al.

(10) Patent No.: US 8,800,782 B2
(45) Date of Patent: Aug. 12, 2014

(54) FILTER ELEMENT

(75) Inventors: Mark A. Roll, Bessemer City, NC (US); Willie L. Stamey, Jr., Kings Mountain, NC (US); Robert H. Ferguson, Gastonia, NC (US)

(73) Assignee: Wix Filtration Corp LLC, Gastonia, NC (US)

( * ) Notice: Subject to any disclaimer, the term of this patent is extended or adjusted under 35 U.S.C. 154(b) by 1253 days.

(21) Appl. No.: 11/735,092

(22) Filed: Apr. 13, 2007

(65) Prior Publication Data

US 2007/0241047 A1 Oct. 18, 2007

Related U.S. Application Data

(60) Provisional application No. 60/791,425, filed on Apr. 13, 2006.

(51) Int. Cl.
*B01D 27/00* (2006.01)
*B01D 35/28* (2006.01)
*B01D 35/00* (2006.01)

(52) U.S. Cl.
USPC ......... 210/437; 210/438; 210/457; 210/493.2

(58) Field of Classification Search
USPC ............................... 210/437, 438, 457, 493.2
See application file for complete search history.

(56) References Cited

U.S. PATENT DOCUMENTS

| | | | |
|---|---|---|---|
| 4,664,529 A | 5/1987 | Cavalli et al. | |
| 4,668,393 A | 5/1987 | Stone | |
| 4,692,245 A | 9/1987 | Church et al. | |
| 4,740,299 A | 4/1988 | Popoff et al. | |
| 4,997,555 A | 3/1991 | Church et al. | |
| 5,092,990 A * | 3/1992 | Muramatsu et al. | 210/136 |
| 5,244,571 A | 9/1993 | Church et al. | |
| 5,362,389 A | 11/1994 | Hardison et al. | |
| 5,362,390 A | 11/1994 | Widenhoefer et al. | |
| 5,362,392 A | 11/1994 | Jensen | |
| 5,547,572 A | 8/1996 | Stone | |
| 5,622,623 A | 4/1997 | Stone | |
| 5,643,446 A | 7/1997 | Clausen et al. | |
| 5,645,718 A | 7/1997 | Hardison et al. | |
| 5,753,120 A * | 5/1998 | Clausen et al. | 210/438 |
| 5,770,065 A | 6/1998 | Popoff et al. | |
| 5,846,417 A * | 12/1998 | Jiang et al. | 210/235 |
| 5,904,844 A | 5/1999 | Stone | |
| 6,015,492 A | 1/2000 | Popoff et al. | |
| 6,053,334 A | 4/2000 | Popoff et al. | |
| 6,113,781 A * | 9/2000 | Popoff et al. | 210/234 |
| 6,171,491 B1 | 1/2001 | Popoff et al. | |
| 6,495,042 B1 | 12/2002 | Knight | |
| 6,555,000 B2 | 4/2003 | Knight | |
| 6,571,962 B2 * | 6/2003 | Thomas | 210/457 |
| 6,679,990 B2 * | 1/2004 | Reinhart | 210/232 |
| 6,797,168 B1 | 9/2004 | Knight | |
| 7,070,692 B2 | 7/2006 | Knight | |
| 7,163,623 B2 | 1/2007 | Knight | |
| 2006/0086652 A1 | 4/2006 | Knight | |

* cited by examiner

*Primary Examiner* — Nam Nguyen
*Assistant Examiner* — Madeline Gonzalez
(74) *Attorney, Agent, or Firm* — Honigman Miller Schwartz and Cohn LLP

(57) ABSTRACT

A filter element comprising an annular filtering media defining first and second axial ends and surrounding an interior area having a central axis, a first end cap sealing attached to said first axial end of said filter media, a second annular end cap sealing attached to said second axial end of said filter media, said second end cap defining a central opening, and a central tube extending from the opening of the second end cap, wherein the central tube includes an actuator exclusive of keys, free ends, or projections.

17 Claims, 19 Drawing Sheets

FILTER ELEMENT

RELATED APPLICATION

This application claims the benefit of U.S. Provisional Patent Application Ser. No. 60/791,425 filed on Apr. 13, 2006, the contents of which are fully incorporated herein by reference.

FIELD

The invention relates to filter elements.

BACKGROUND

Various filter elements are known in the art for filtering fluid as it passes through a fluid path. Filter elements include, in part, filtering media which remove impurities from a fluid, such as, for example, oil or fuel that passes through a filter media.

In most applications, either the filter element or the filter media associated therewith must be periodically replaced to reduce the potential of developing unacceptably high impedance in the fluid path flow restriction.

While known filter elements have proven to be acceptable for various applications, such conventional filter elements are nevertheless susceptible to improvements that may enhance their overall performance and cost. Therefore, a need exists to develop improved filter assemblies that advance the art.

BRIEF DESCRIPTION OF THE DRAWINGS

The present disclosure will now be described, by way of example, with reference to the accompanying drawings, in which.

DETAILED DESCRIPTION

Figure 1A:
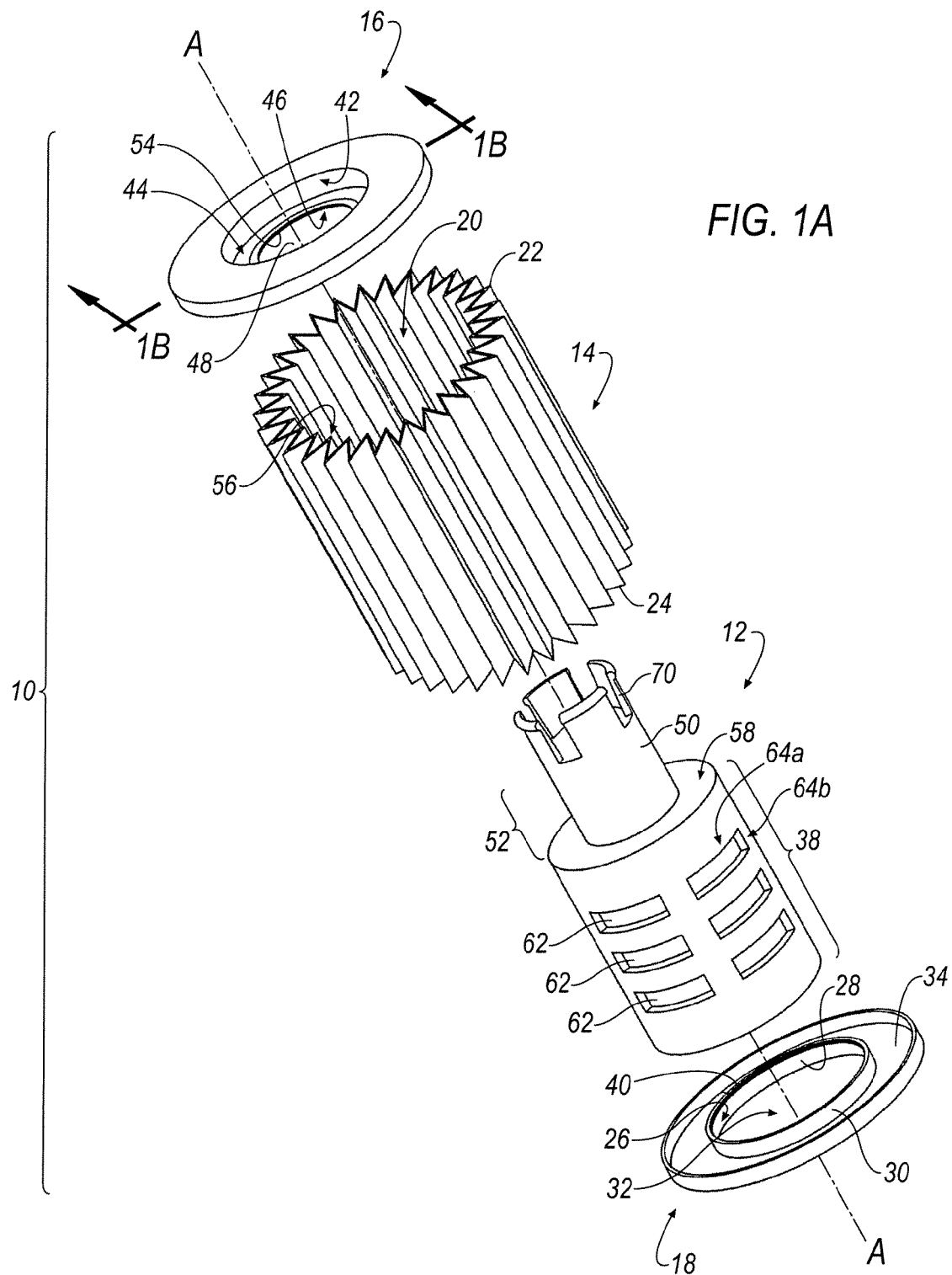
FIG. 1A is an exploded isometric view of a filter element in accordance with an exemplary embodiment of the invention.

The Figures illustrate exemplary embodiments a filter element for a housing in accordance with embodiments of the invention. For brevity, the disclosure hereof will illustrate and describe a central tube of a filter element in various exemplary embodiments. Based on the foregoing, it is to be generally understood that the nomenclature used herein is simply for convenience and the terms used to describe the invention should be given the broadest meaning by one of ordinary skill in the art.

Referring to FIGS. 1A-4, a filter element 10 is shown according to an exemplary embodiment of the invention. According to an embodiment, the filter element 10 includes a central tube 12, filter media 14, an upper, first end cap 16, and a lower, second end cap 18.

The central tube 12, first end cap 16, and second end cap 18, may each be formed of any desirable material, such as, for example, a thermoplastic resin, by way of any desirable forming technique, such as, for example, injection molding, insert molding, or the like. According to an embodiment, the filter media 14 may include, for example, a ring of a pleated filter media.

Figure 1B:
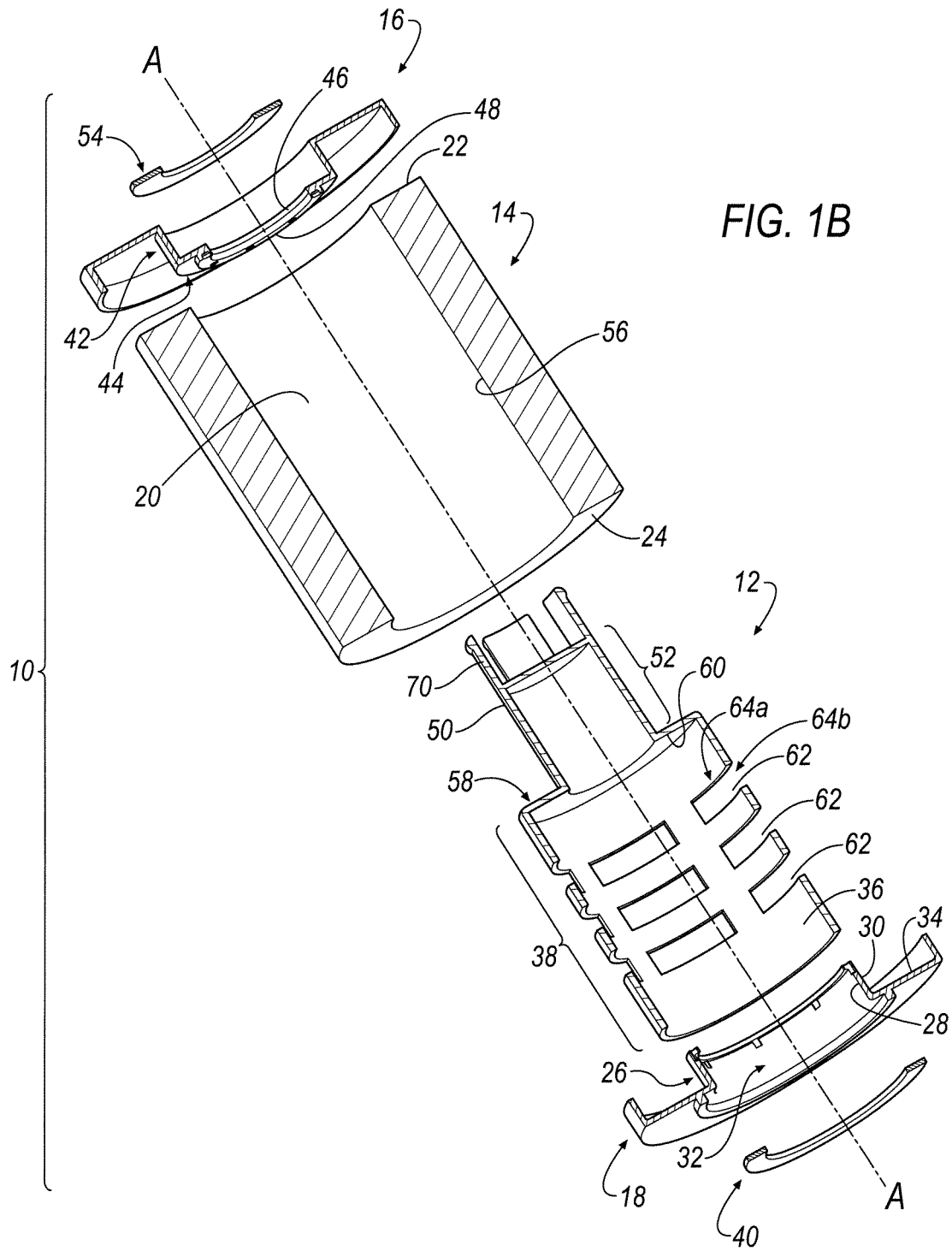
FIG. 1B is an exploded isometric cross-sectional view of a filter element in accordance with an exemplary embodiment of the invention.
Figure 2:
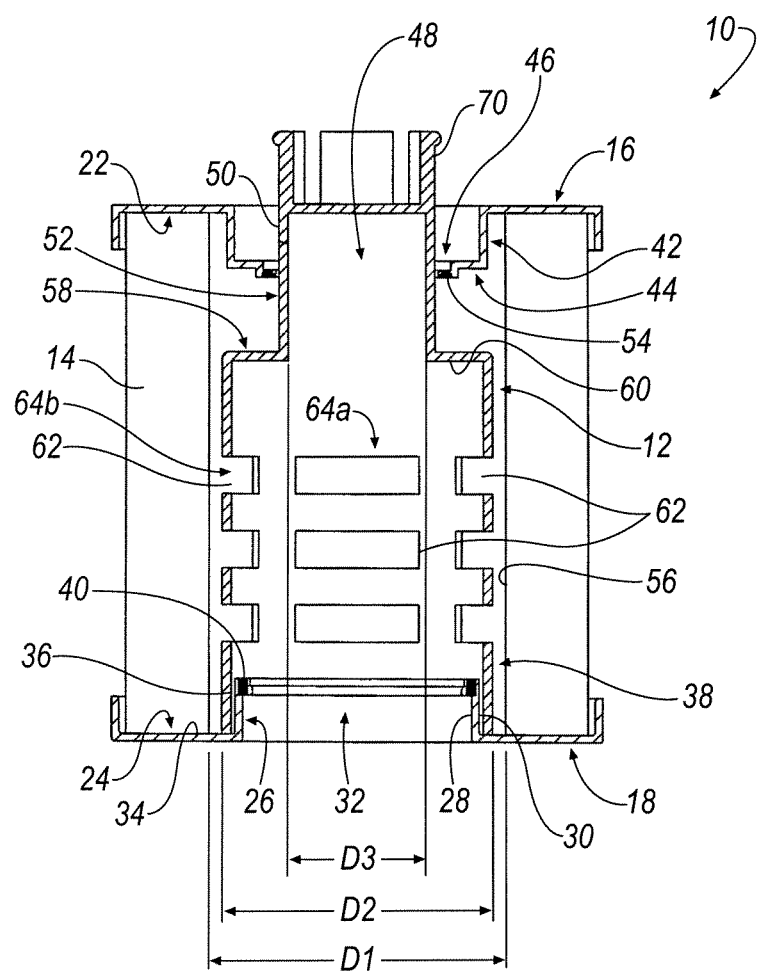
FIG. 2 is an assembled cross-sectional view of the filter element of FIG. 1B in accordance with an exemplary embodiment of the invention.
Figure 3:
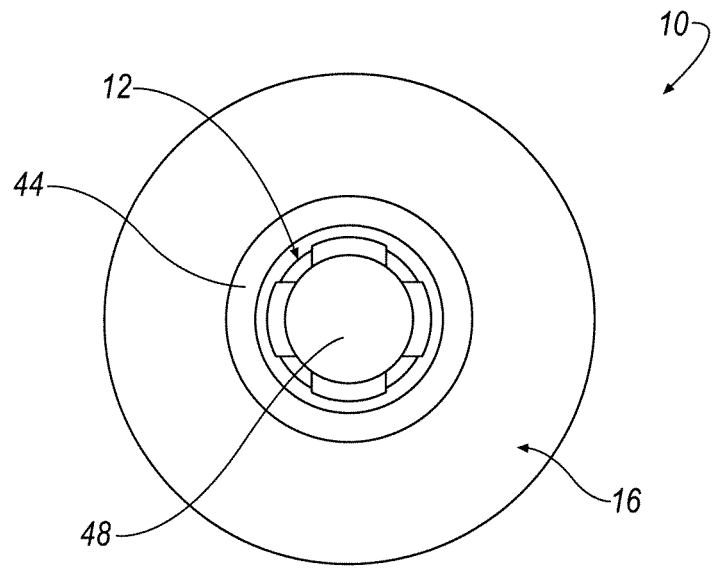
FIG. 3 is an assembled top view of the filter element of FIG. 1A in accordance with an exemplary embodiment of the invention.
Figure 4:
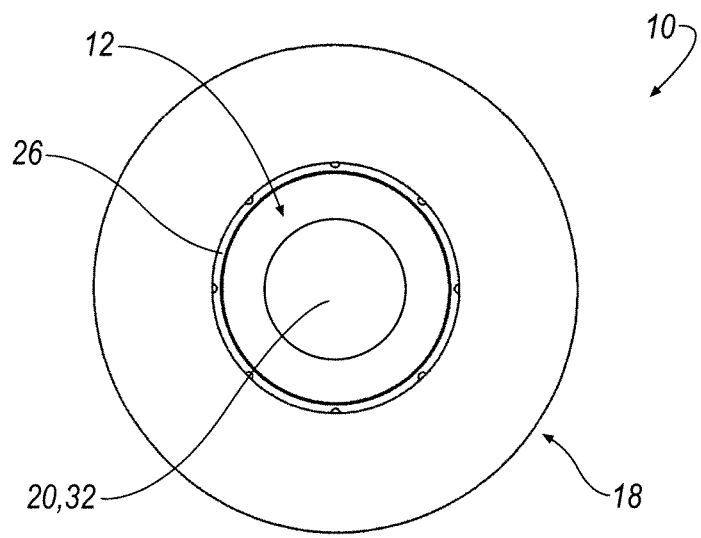
FIG. 4 is an assembled bottom view of the filter element of FIG. 1A in accordance with an exemplary embodiment of the invention.

According to an embodiment, as seen in FIGS. 1A and 1B, the filter media 14 defines an interior volume 20 and encompasses a central axis, A-A extending through the central tube 12, filter media 14, and end caps 16, 18. As seen in FIG. 2, the end caps 16, 18 support and engage the filter media 14 in fluid tight relation at a first end 22 and a second end 24, respectively, of the filter media 14 in any desirable manner by using, for example, an adhesive, a potting compound, or forming the end caps around the filter media when the end cap material is still in a plastic (i.e. deformable) state. According to an embodiment, the central tube 12 may be secured to the second end cap 18 (although the present invention is not limited to this configuration). According to an embodiment, the central tube 12 may be integrally-formed with the second end cap 18 as a one-piece unitary member.

Referring to FIGS. 1A-2, the lower end cap 18 includes an inner axially extending flange portion 26 having an inner periphery 28 and an outer periphery 30. The inner periphery 28 defines an opening 32 formed in the lower end cap 18. According to an embodiment, the outer periphery 30 of the extended flange portion 26 may be adapted to receive and/or engage an inner surface 36 of a first segment 38 of the central tube 12. An annular seal 40 may be disposed on the second, lower end cap 18 for radially sealing second, lower end cap against a standpipe 100.

The first, upper end cap 16 includes an axially extending flange portion 42 and a radially extending flange portion 44 that extends substantially perpendicularly from the inner axially extending flange portion 42. The radial flange portion 44 includes an inner periphery 46 that defines a central opening 48 formed in the first, upper end cap 16. According to an embodiment, the central opening 48 of the upper end cap 16 is adapted to at least partially receive an outer surface 50 of a second substantially cylindrical side wall portion 52 of the central tube 12 or an end of central tube 12. An annular resilient seal 54 may be disposed between the first, upper end cap 16 and the outer surface 50 of a second segment 52 of the center tube 12.

Figure 5:
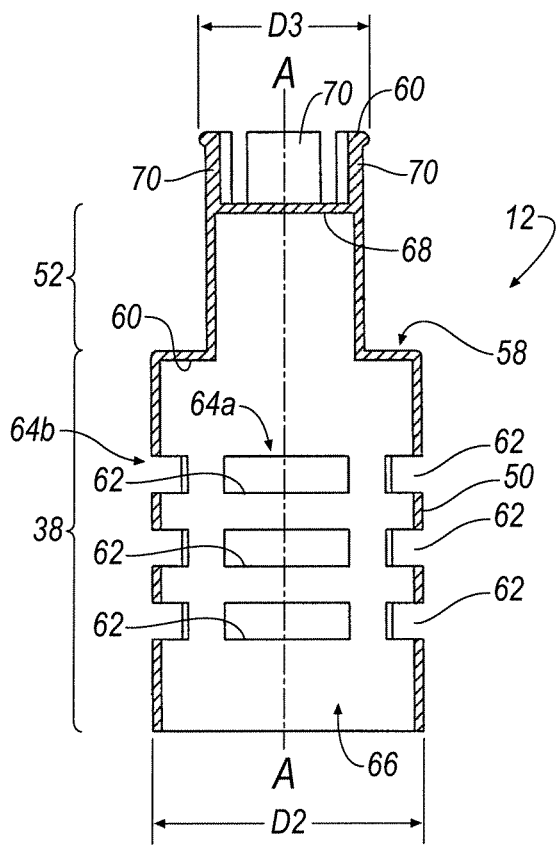
FIG. 5 is a cross-sectional view of a center tube of the filter element of FIG. 1A in accordance with an exemplary embodiment of the invention.

Referring to FIG. 5, the central tube 12 includes the first segment 38 and the second segment 52. As shown in FIG. 2, the first segment 38 is coaxial with the filter media 14. According to an embodiment, an inner peripheral surface 56 of the filter media 14 defines the interior volume 20 having dimension, D1. The first segment 38 includes an outside dimension, D2, that is less than the passage dimension, D1. The second segment 52 includes a dimension, D3, that is less than the dimension, D2, of the first segment 38.

Referring to FIG. 5, in an embodiment, the central tube 12 may further be defined by an intermediate segment 58 that joins the first segment 38 to the second segment 52. As illustrated, the intermediate segment 58 is substantially perpendicular to the central axis, A-A. According to an embodiment, the intermediate segment 58 provides a load-bearing shoulder 60. The load-bearing shoulder 60 may be substantially flat and a portion thereof may engage a standpipe, an embodiment of which will be described in greater detail below.

In an embodiment, the first segment 38 may be perforated. In an embodiment, the first segment 38 defines a plurality of radial fluid passages 62. According to an embodiment, the radial fluid passages 62 may function as fluid intake passages and may be arrayed in axially aligned columns 64a and disposed about the periphery of the first substantially cylindrical side wall portion 38. According to an embodiment, three radial fluid intake passages 62 are provided in each axial column 64a. In general, the fluid intake passages 62 of each axial column 64a are also radially-aligned to define a ring 64b of fluid intake passages 62. If, for example, five axial columns 64a are included, five fluid intake passage 62 are included in the ring 64b.

According to an embodiment, five axial columns 64a and three rings 64b of fluid intake passages 62 may be arranged in the periphery of the first segment to define a matrix of fifteen fluid intake passages 62. Although the above-described embodiment discusses three radial fluid intake passages 62 disposed in each axial column 64a with five axial columns 64 being arranged in the periphery of the first segment 38, it will be appreciated upon considering the present disclosure that the central tube 12 may include any desirable number and arrangement of fluid intake passages 62.

Figure 6:
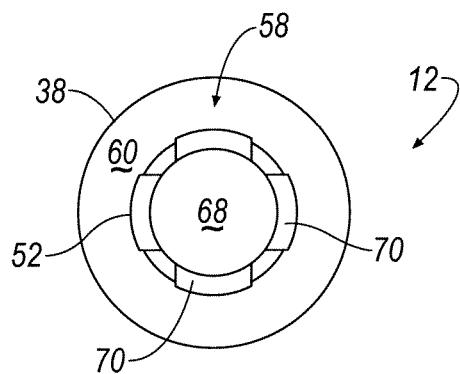
FIG. 6 is a top view of the center tube of FIG. 5 in accordance with an exemplary embodiment of the invention.
Figure 7:
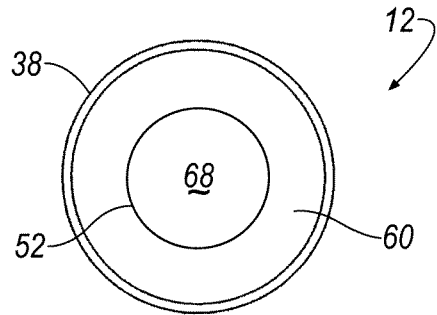
FIG. 7 is a bottom view of the center tube of FIG. 5 in accordance with an exemplary embodiment of the invention.

Referring to FIGS. 5-7, the first segment 38 may define, in part, an axial passage 66 having an outer dimension, D2, and, the second segment 52 may include an axial end wall 68 having an outer dimension, D3. In an embodiment, the axial end wall 68 may be arranged substantially perpendicular to the central axis, A-A. In an embodiment, the passage 66 may provide an opening into the central tube 12 and the end wall 68 may close-off an end of the central tube 12.

In an embodiment, second segment 52 may further include a series of distinct, axially-extending flexible fingers 70. According to an embodiment, the fingers 70 may be arranged about a periphery of second segment. According to an embodiment, four fingers 70 extend from the central tube 12. It will be appreciated that the fingers 70 are, advantageously, not in direct contact with the upper end cap 16 (i.e. seal 54 is interposed therebetween). Prior art assemblies project fingers directly from an end cap, whereas the disclosed design disperses stress associated with the fingers across other filter element structure. Although the above-described embodiment depicts four fingers 70, it will be appreciated upon considering the present disclosure that the central tube 12 may include any desirable number of fingers 70 and the invention hereof should not be limited thereby.

Figure 8:
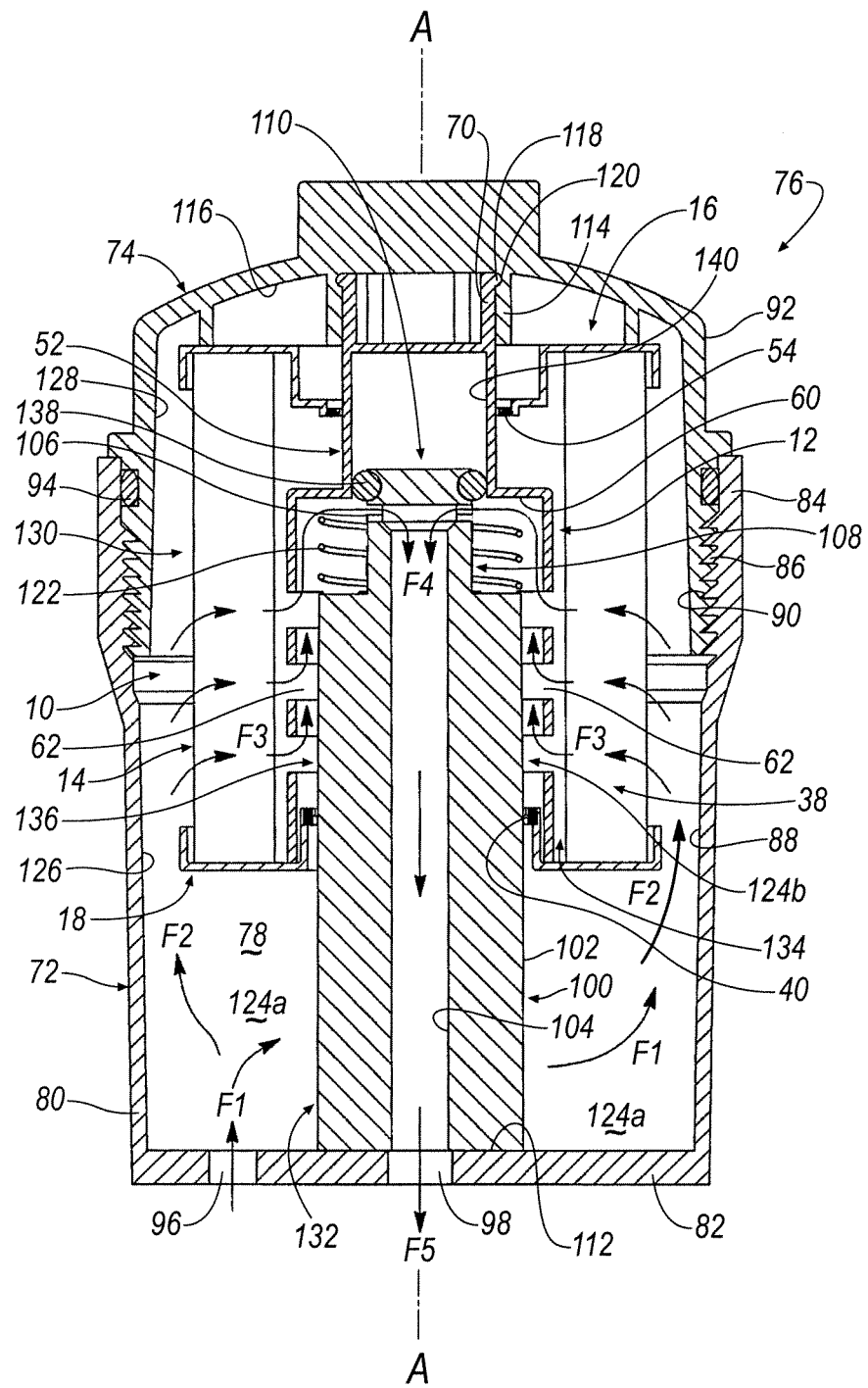
FIG. 8 is an assembled, cross-sectional view of the filter element of FIG. 1A disposed in a housing that is closed off with a cover in accordance with an exemplary embodiment of the invention.

Referring now to FIG. 8, the filter element 10 is shown disposed inside chamber or cavity 78 defined by housing 72 and cover 74. Filter element 10, housing 72, and cover 74 define filter assembly 76. The housing 72 and the cover 74 are formed from any desirable material, such as, for example, a metal, hard thermoplastic resin, or the like. Appropriate brackets and other attachment structure (not shown) may be provided, as desired, proximate and/or on the housing 72 to enable the housing 72 to be fixed to an appropriate location proximate and/or in/on a support structure for a particular application, such as, for example, the filtering of an oil or fuel fluid associated with an automotive application.

According to an embodiment, arrows, F1-F5, in general, define a radially outside-in fluid flow pattern within the cavity 78 and filter media 14.

In an embodiment, the housing 72 may include a cup-shaped or annular housing body 80, a closed end 82, open end 84. In an embodiment, the cover 74 may be removably-attached to the housing body 80 proximate an open housing end 84 by way of internal threads 86 formed on an internal peripheral surface 88 of the housing body 80 and external threads 90 formed on an external peripheral surface 92 of the cap 74. The housing 72 and cap 74 may be fluidly-sealed by way of, for example, a seal 94, O-ring, grommet, or the like.

The housing 72 is provided with one or more fluid inlet ports 96 for unfiltered fluid and one or more fluid outlet ports 98. Ports 96 and 98 allow for the ingress and egress of fluid into and out from housing 72.

In an embodiment, the housing 72 may include a standpipe 100 that extends within the cavity 78 in a substantially coaxially manner with the central axis, A-A. In an embodiment, the standpipe 100 may include a substantially cylindrical body 102 having an internal flow passage 104 that is in fluid communication with the outlet port 98. A flow of fluid in the internal flow passage 104 may be regulated by a flow control valve (not shown) fluidly coupled to the standpipe. In an embodiment, the cylindrical body 102 includes one or more inlet openings 106 provided in a neck portion 108 of the cylindrical body 102 that allow fluid to radially inward into the internal flow passage 104 of the cylindrical body 102.

As shown in FIG. 8, when the filter element 10 is disposed within cavity 78 in the first step of assembling of the filter assembly 76, the central tube 12 and filter media 14 substantially surround a portion of standpipe 100 in a manner such that the center tube 12 and filter media 14 both substantially circumscribe the central axis, A-A.

When the cover 74 is connected to the housing 72, one or more projections 114 axially extending away from a top wall surface 116 include under-cut portions that correspondingly-engage the fingers 70. As illustrated, each finger 70 may include a bead 118 that extends, in part, radially away from the central axis, A-A. Each under-cut portion may include an inner recess 120 to matingly receive each bead 118. Mating engagement between fingers 70 and projections 114 cooperate to retain the filter element 10 with the cover 74 when the cover 74 is separated from housing 72.

In an embodiment, in operation, an unfiltered or contaminated fluid flows into the inlet chamber 124a of the housing 72 through the inlet port 96 according to the general direction of the arrow, F1. Then, the unfiltered fluid generally flows into a portion of the inlet chamber 124a surrounding the filter media 14 according to the general direction of the arrow, F2. Then, the fluid flows in a generally radially inward direction through the filter media 14 according to the direction of the arrow, F3. Then, a filtered fluid generally flows through the fluid intake passages 62 formed in the central tube 12 and into the exit chamber 124b in the general direction of the arrow, F4. Then, the filtered fluid, which is generally cleansed of impurities, generally flows from the exit chamber 124b into flow passage 104 of standpipe 100 and exits the housing 72 through the outlet port 98 according to the general direction of the arrow, F5.

In an embodiment, the seals 40, 54 fluidly seal the exit chamber 124b against infiltration of contaminated fluid from the inlet chamber 124a. As illustrated, the seal 40 may be dimensioned to axially-receive the standpipe 100. In addition, if desired, a seal member 138 may be disposed axially against the neck portion 108 of the standpipe 100 to engage an inner cylindrical surface 140 of the second segment 52 of the central tube 12.

A filter element 1000 of a filter assembly 1092 (FIG. 17) is shown in FIGS. 9A-11 according to an embodiment. According to an embodiment, the filter element 1000 includes a central support tube 1002, filter media 1004, an upper, first end cap 1006, and a lower, second end cap 1008.

Figure 9A:
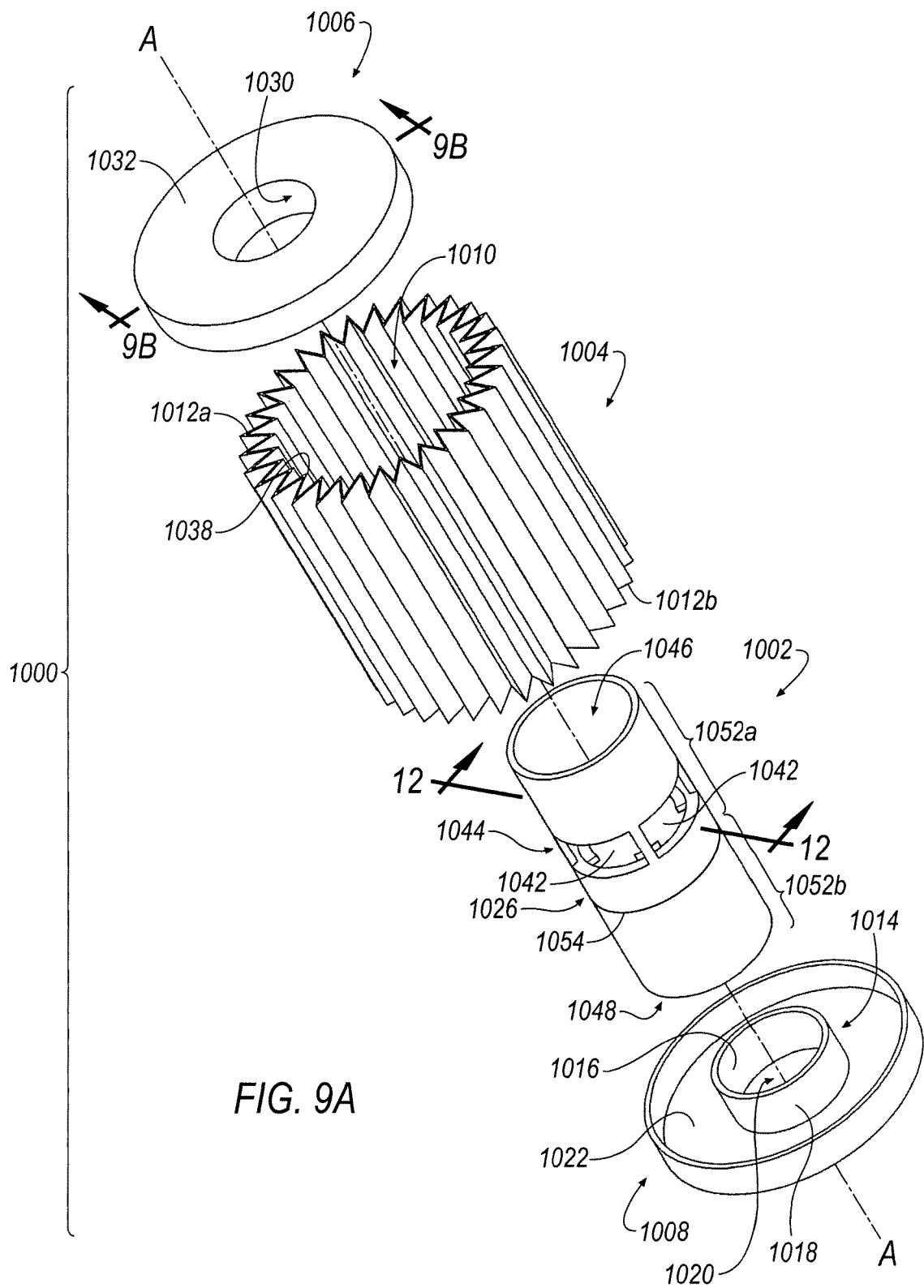
FIG. 9A is an exploded isometric view of a filter assembly in accordance with an exemplary embodiment of the invention.
Figure 9B:
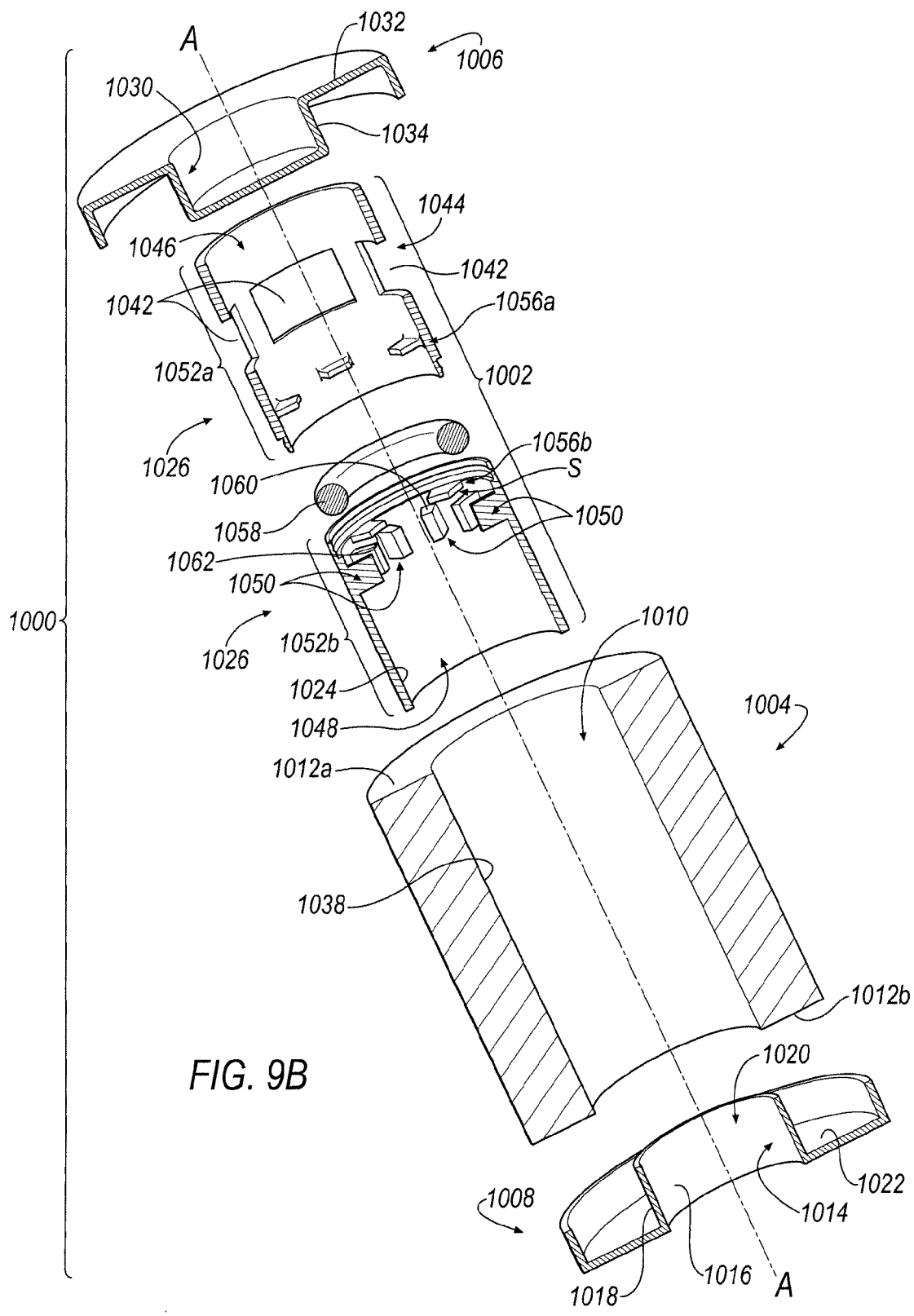
FIG. 9B is an exploded isometric cross-sectional view of a filter element in accordance with an exemplary embodiment of the invention.
Figure 10:
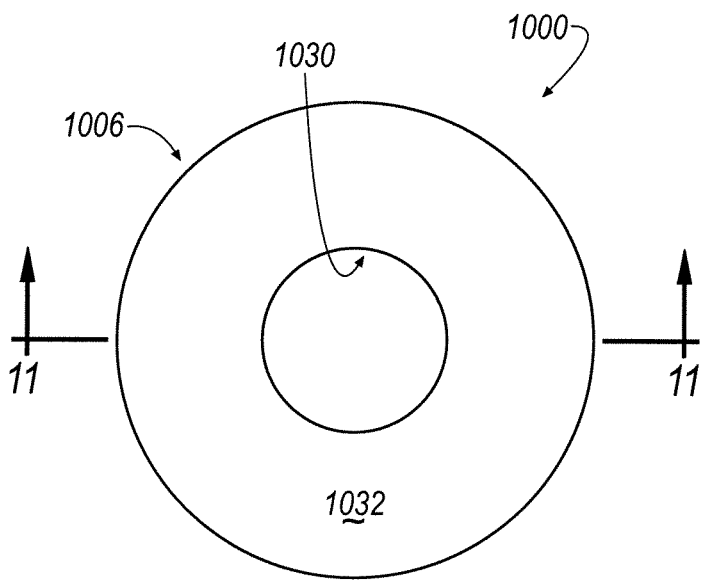
FIG. 10 is a top view of a first end cap of the subassembly of FIG. 9A in accordance with an exemplary embodiment of the invention.
Figure 11:
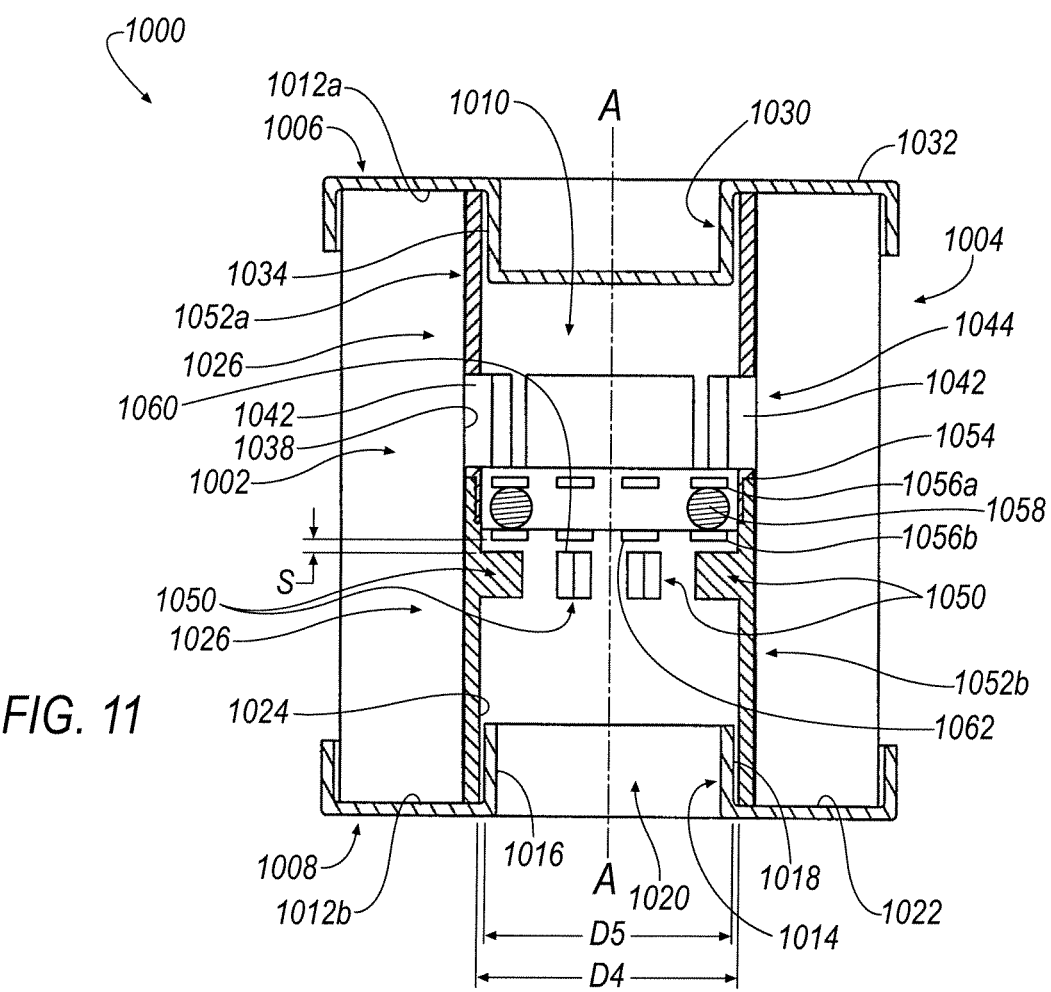
FIG. 11 is an assembled cross-sectional view of the filter element of FIG. 9A in accordance with an exemplary embodiment of the invention.

According to an embodiment, as seen in FIGS. 9A and 9B, the filter media 1004 defines an interior volume 1010 that encompasses a central axis, A-A. As seen in FIG. 11, end caps 1006, 1008 support and engage the filter media 1004 in fluid tight relation at a first end 1012a and a second end 1012b of the filter media 1004 in any desirable manner by using, for example, an adhesive, a potting compound, or the like. According to an embodiment a portion of the central tube 1002 may be radially relatably disposed adjacent to the second end cap 1008. In an embodiment, the central tube 1002 may be integrally-formed with the second end cap 1008 as a one-piece unitary member.

Figure 17:
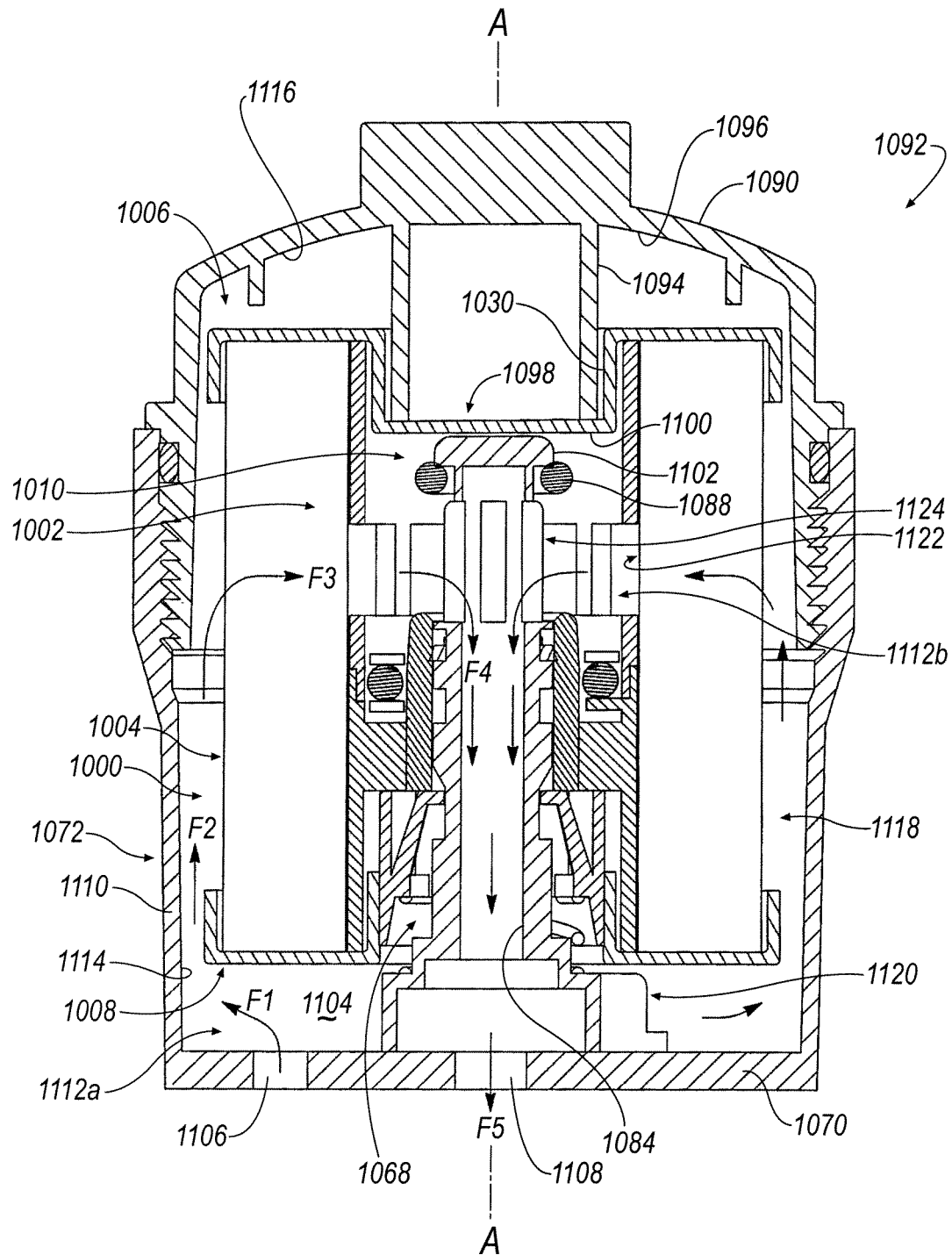
FIG. 17 is an assembled, cross-sectional view of the filter element of FIG. 9A disposed in a housing including the standpipe and flow control valve of FIG. 14, the housing of which is closed off with a cover in accordance with an exemplary embodiment of the invention.
Figure 18:
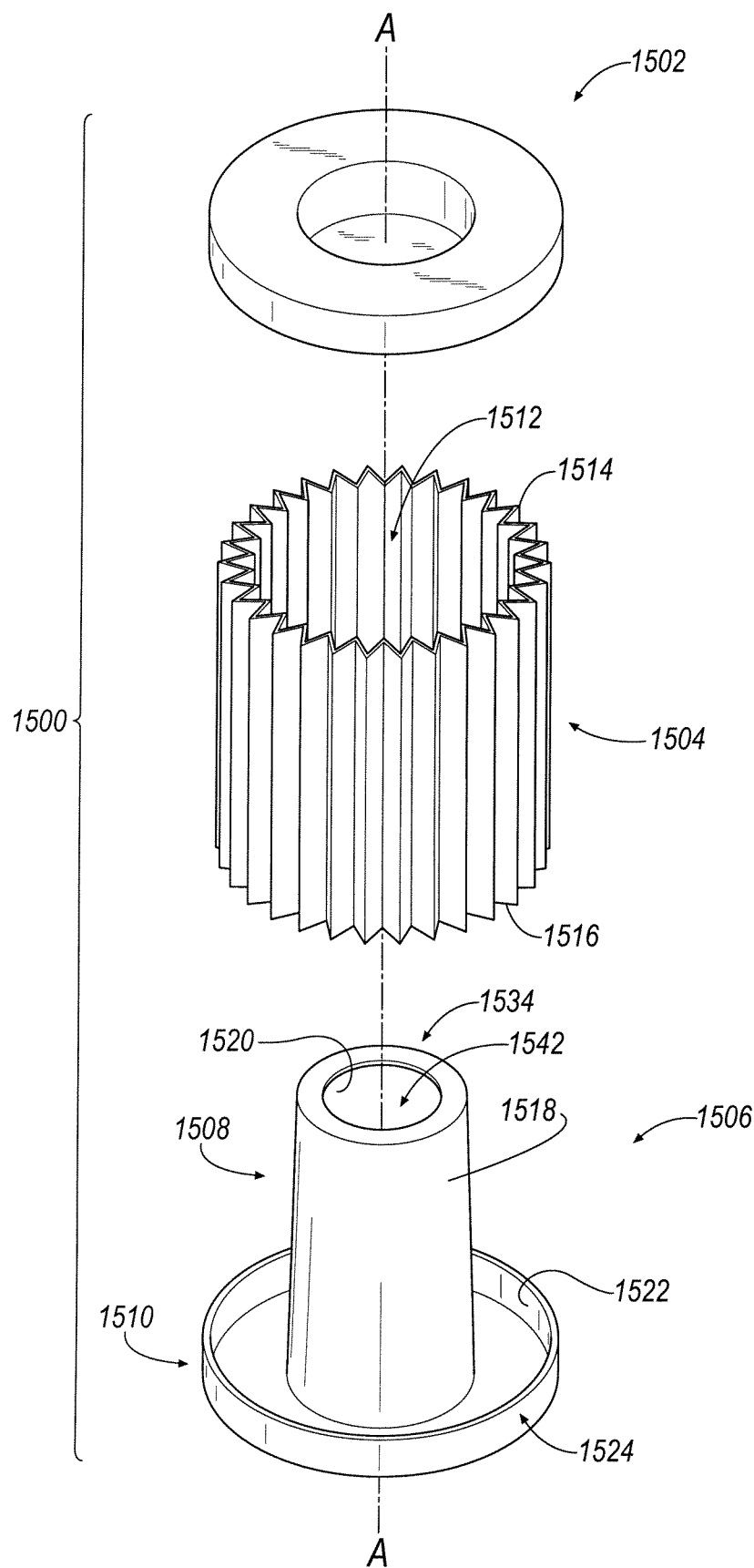
FIG. 18 is an exploded isometric view of a filter element in accordance with an exemplary embodiment of the invention.

Referring to FIG. 11, the second, lower end cap 1008 includes an inner axial extending flange portion 1014 having an inner periphery 1016 and an outer periphery 1018. The inner periphery 1016 defines a central opening 1020 formed in the lower end cap 1008. According to an embodiment, an inner radially extending surface 1022 and the outer periphery 1018 of the lower end cap 1008 are adapted to receive an inner surface 1024 of a first portion 1026 of the central tube 1002. In an embodiment, an annular resilient seal may be disposed on the inner periphery 1016 of the second, lower end cap 1008 for sealing against a standpipe 1068 (FIG. 17).

The first, upper end cap 1006 includes an inner axially extending flange portion 1030 that extends substantially perpendicularly from an outer radially extending surface 1032 of the upper end cap 1006. The axially extending flange portion 1030 defines an inner periphery 1034 that is adapted to receive the second portion 1026 of the central tube 1002. In an embodiment, an annular resilient seal (not shown) may be disposed along the inner periphery 1034 of the first, upper end cap 1006 for sealing against first portion 1026 of the central tube 1002.

Referring to FIG. 11, the central tube 1026 may be coaxial with the filter media 1004. According to an embodiment, an inner peripheral surface 1038 of said filter media 1004 defines a passage dimension, D4.

The central tube 1026 further defines a plurality of fluid intake passages 1042. According to an embodiment, the fluid intake passages 1042 may be arranged in a ring structure 1044. According to an embodiment, four radial fluid intake passages 1042 are provided in each ring 1044. Although the above-described embodiment discusses four radial fluid intake passages 1042 arranged in one ring 1044, it will be appreciated upon considering the present disclosure that the central tube 1002 may include any desirable number of fluid intake passages 1042 in any desirable configuration including, for example, two or more ring configurations.

Figure 12:
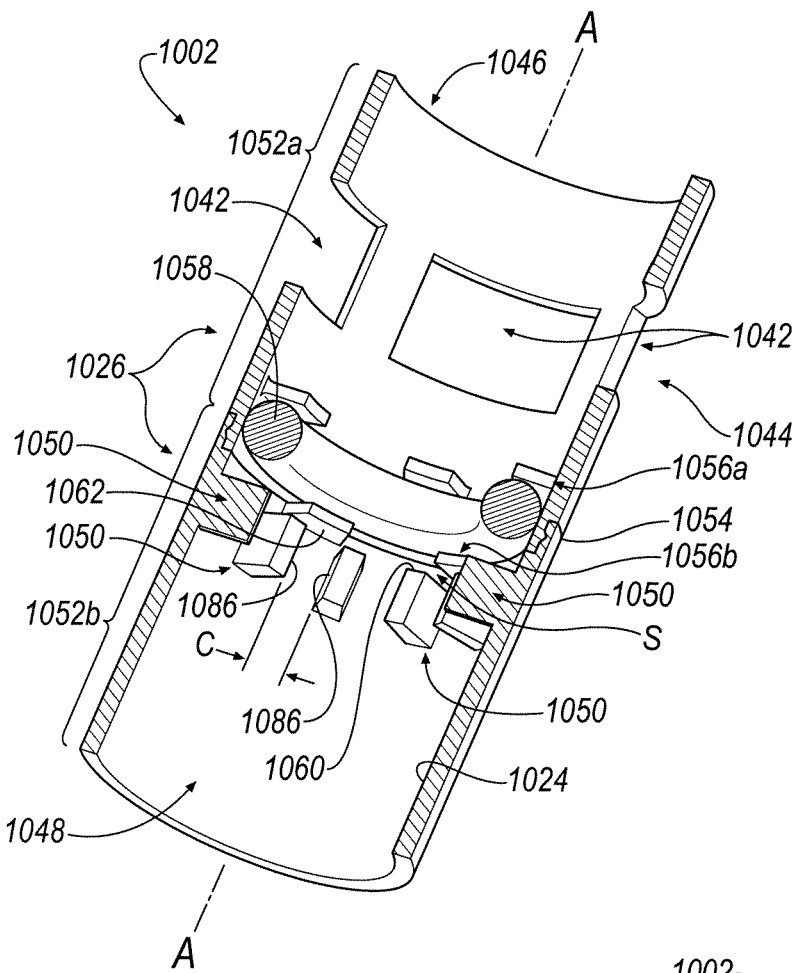
FIG. 12 is an isometric cross-sectional view of a center tube of the filter element of FIG. 9A in accordance with an exemplary embodiment of the invention.
Figure 13:
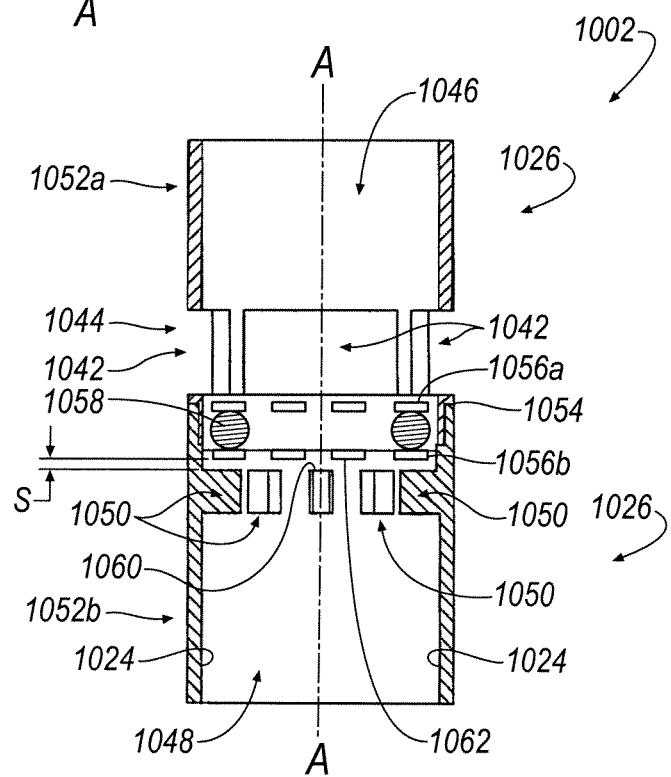
FIG. 13 is a cross-sectional view of the center tube of the filter element of FIG. 9A in accordance with an exemplary embodiment of the invention.
Figure 14:
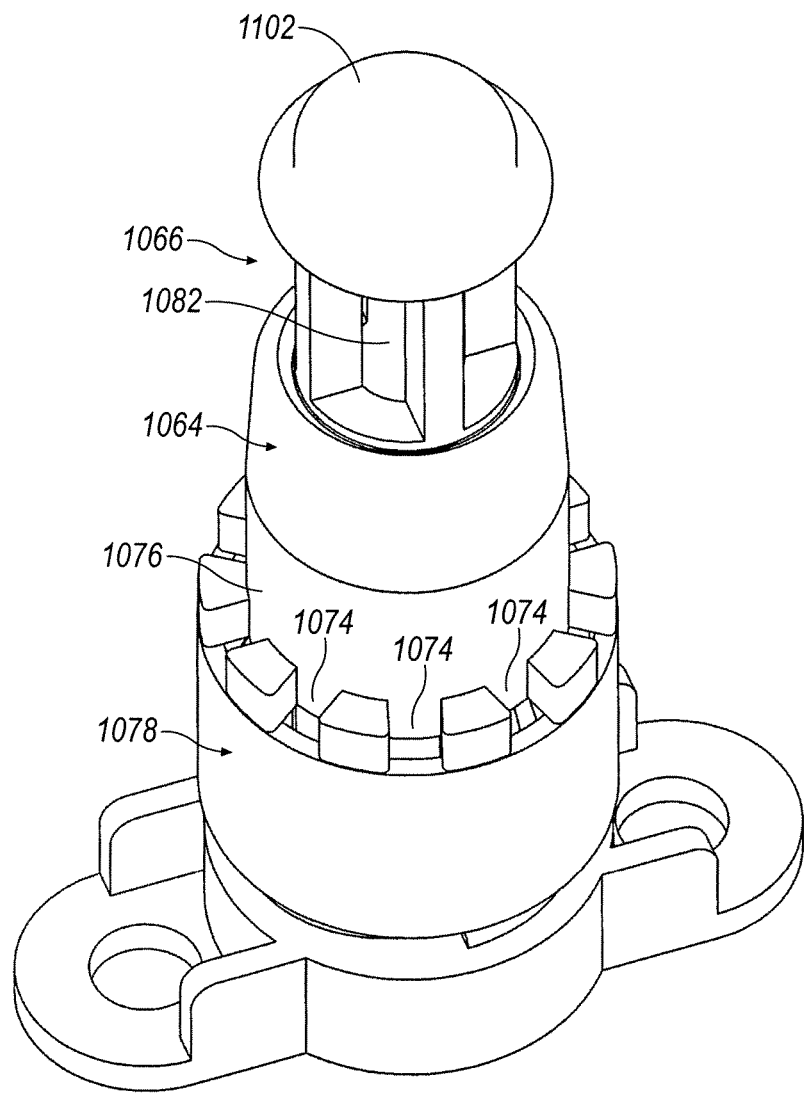
FIG. 14 is an isometric view of a standpipe and a flow control valve in accordance with an exemplary embodiment of the invention.
Figure 15:
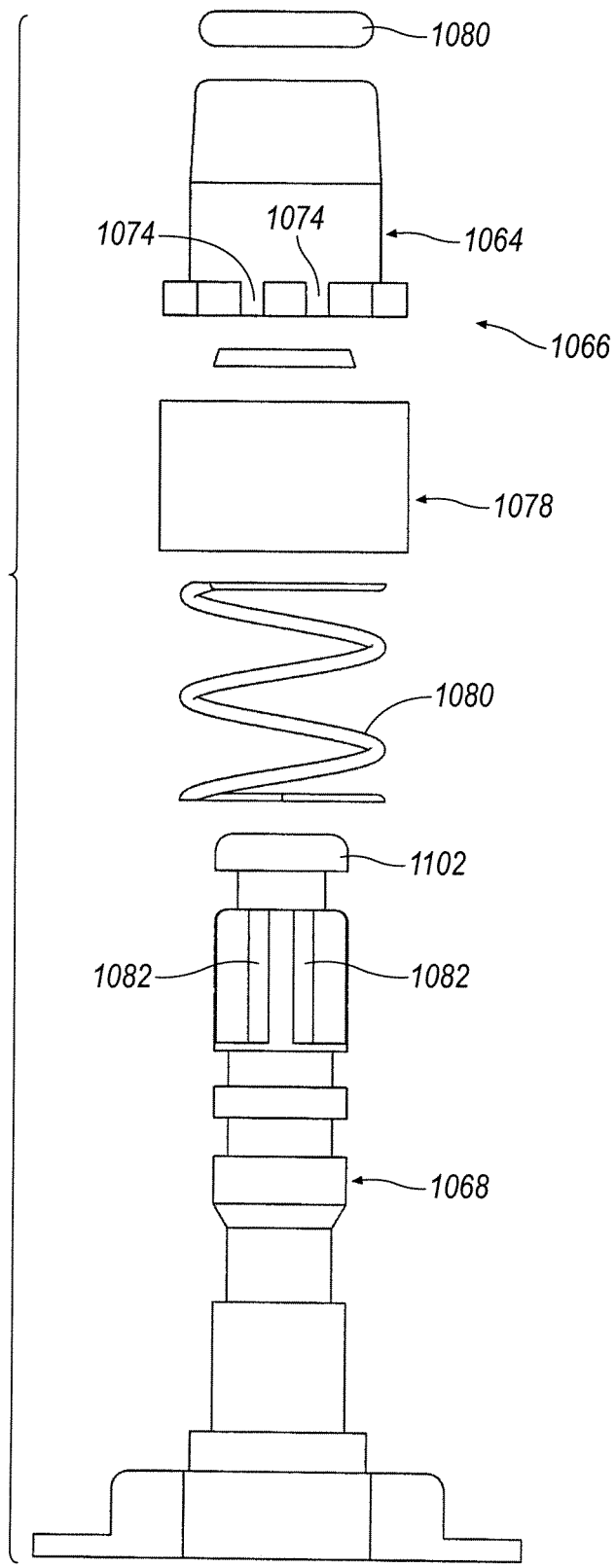
FIG. 15 is an exploded side view of the standpipe and flow control valve of FIG. 14.
Figure 16A:
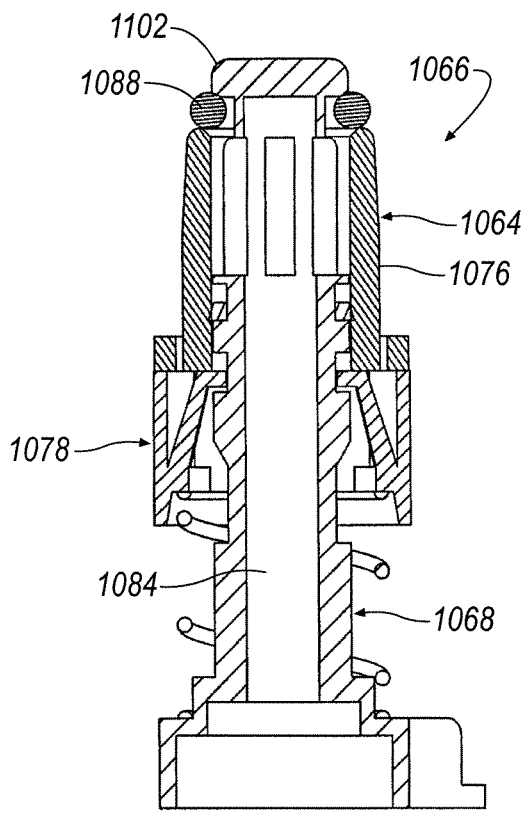
FIG. 16A is a cross-sectional view of the standpipe and flow control valve of FIG. 14 in a first position.
Figure 16B:
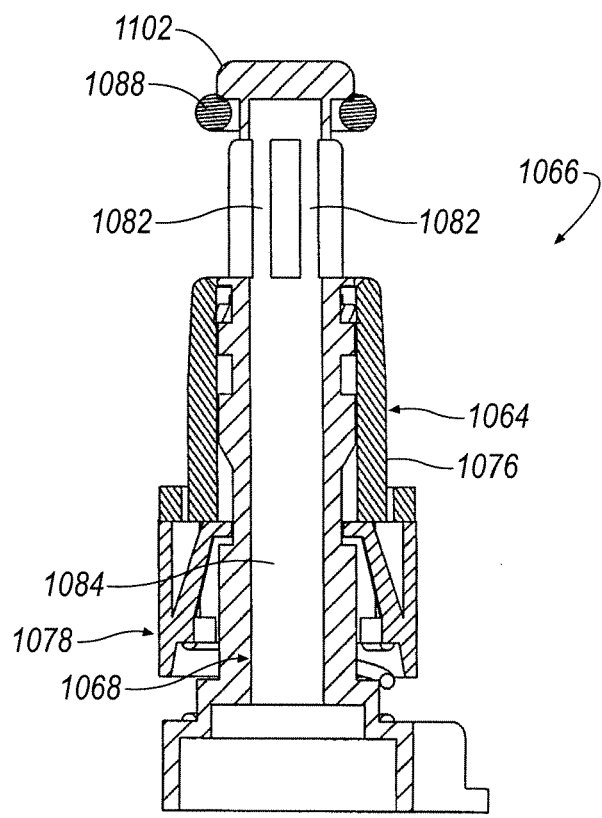
FIG. 16B is a cross-sectional view of the standpipe and flow control valve of FIG. 14 in a second position.

Referring to FIGS. 12 and 13, the central tube may be further defined to include first and second axial passages 1046, 1048 approximately equal to the dimension, D5. In addition, the central tube include one or more projections 1050 that radially extend toward the central axis, A-A. Projections 1050 may be integrated into the central tube 1002. Also, projections 1050 may extend from inner surface 1024 of central tube 1002.

Referring to FIGS. 12 and 13, in an embodiment, the central tube 1002 may be further defined to include a first, discrete upper segment 1052a, and a second, discrete lower segment 1052b that are matingly joined to one another. According to an embodiment, the segments 1052a, 1052b are connected to one another and define a seam 154. According to an embodiment, the connection of the segments 1052a, 1052b may be provided with an adhesive, or, alternatively, any desirable well-known mechanical connection, such as, for example, a snap-fit connection. According to an embodiment, each of the projections 1050 are discrete from one another and radially project from the inner surface 1024 of the lower segment 1052b of the central tube 1002.

According to an embodiment, as shown in FIGS. 9B and 12, each of the upper and lower segments 1052a, 1052b include one or more seal supports 1056a, 1056b, that, respectively, provide axial support for a seal 1058. Seal 1058 may reside between the seal supports 1056a of the upper segment 1052a and the seal supports 1056b of the lower segment 1052b. In an embodiment, the projections 1050, are formed proximate and separate from the seal supports 1056b of the lower segment 1052b by an axial gap or axial spacing, S (see FIG. 13), defined between a surface 1060 of each projection 1050 and a surface 1062 of each seal support portion 1056b of the lower segments 1052b.

According to an embodiment, the seal 1058 radially-engages a closure element 1064 (FIGS. 14-16B) of a flow control valve 1066 provided in a standpipe 1068.

Referring to FIGS. 14-16B, in operation, the projections 1050 are provided to mate with the closure element 1064 of the flow control valve 1066 provided with the standpipe 1068. The flow control valve 1066 and standpipe 1068 may be separate or integral components of a housing 1072 (FIG. 17). According to an embodiment, the flow control valve 1066 may include a plurality of openings or slots 1074 formed with an outer wall 1076 for receiving the projections 1050 of the central tube 1002. As such, the projections 1050 axially depresses snap-ring 1078 of the flow control valve 1066 against a bias of a spring 1080 (FIG. 15) to allow a flow of fluid flow through one or more inlet openings 1082 and through a passage 1084 (FIGS. 16A, 16B) of the standpipe 1068.

When the filter element 1000 is installed in the housing 1072, the projections 1050 engage the snap ring 1078. As the filter element 1000 is axially-positioned close to a closed end 1070 (FIG. 17) of the housing 1072, the projections 1050 and the seal 1058 force the closure element 1064 axially away from a standpipe seal 1088 (FIG. 17), thereby compressing the spring 1080 and thereby exposing one or more inlet openings 1082 in order to enable the fluid to be admitted into the internal flow passage 1084 of the standpipe 1068.

Referring to FIG. 17, the housing 1072 is closed off by a cover 1090, and, when the filter element 1000 is positioned in the housing 1072, a filter assembly is provided and shown generally at 1092. The housing 1072 and cover 1090 may be attached to one another in any desirable manner, such as, for example, by way of a threaded connection as shown and similarly described above according to the filter assembly 76. As illustrated, the cover 1090 includes one or more portions 1094 that axially extend from an inner surface 1096 of the cap 1090 and that engage an outer, recessed, load-bearing surface 1098 of the first end cap 1006.

In an embodiment, the housing 1072 is provided with a fluid inlet port 1106 and a fluid outlet port 1108 that directs fluid into and out of the housing 1072. Fluid, such as oil or fuel, to be filtered by the filter media 1004 and is directed through the inlet port 1106 and into a peripheral region of the cavity 1104 of the filter assembly 1092 between a housing body 1110 and the filter media 1004. In an embodiment, the oil or fuel then generally passes through the filter media 1004, where contaminates, particulate matter, and the like in the fluid are generally removed. The filtered fluid then generally passes through the outlet port 1108 to the downstream components of a lubrication or fuel system of the internal combustion engine (not shown).

In operation, an unfiltered or contaminated fluid generally flows into the inlet chamber 1112a of the housing 1072 through the inlet port 1106 according to the general direction of the arrow, F1. Then, the unfiltered fluid then generally flows into a portion of the inlet chamber 1112a surrounding the filter media 1004 according to the general direction of the arrow, F2. Then, the fluid flows generally through the filter media 1004 according to the general direction of the arrow, F3. Then, a filtered fluid generally flows through the intake passages 1042 in the central tube 1002 and into the exit chamber 1112b in the direction of the arrow, F4. Then, the filtered fluid, which is substantially cleansed of impurities, generally flows from the exit chamber 1112b into the standpipe 1068 and generally exits the housing 1072 through the outlet port 1108 according to the general direction of the arrow, F5.

Referring to FIGS. 18-21, a filter element 1500 is shown according to an exemplary embodiment of the invention. According to an embodiment, the filter element 1500 includes an upper, first end cap 1502, a lower, second end cap 1510, filter media 1504, and a central tube 1508 extending from the second end cap 1510. In an embodiment, the central tube 1508 is unitary with the lower end cap 1510, and is formed as one part therewith. In an embodiment, the central tube 1508 is sealingly attached to the lower end cap. Central tube may be fashioned in any number of configurations, for example, a right cylinder, or a conical frustum structure.

Figure 19:
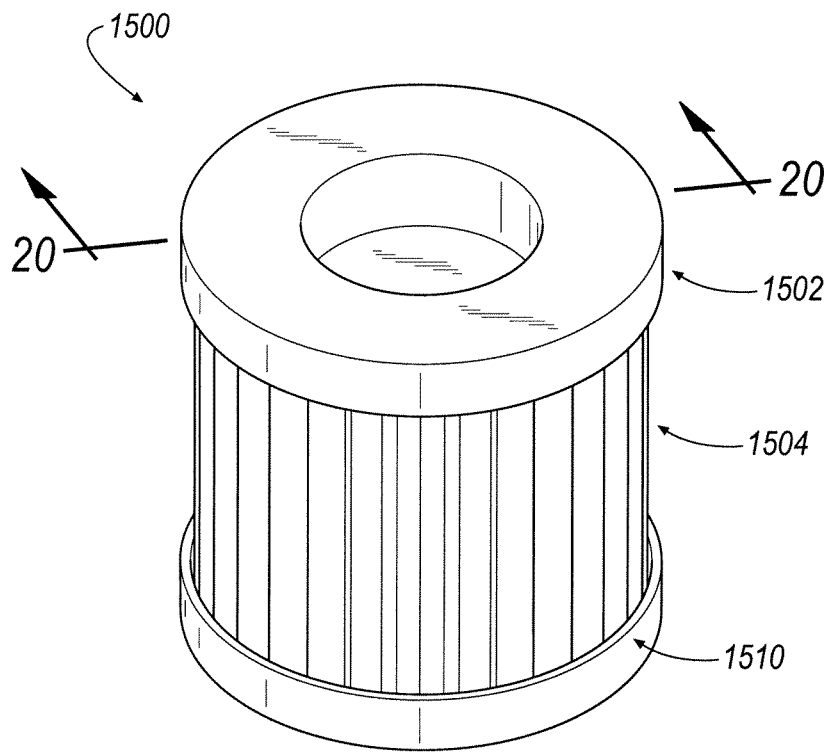
FIG. 19 is an assembled isometric view of the filter element of FIG. 18 in accordance with an exemplary embodiment of the invention.
Figure 20:
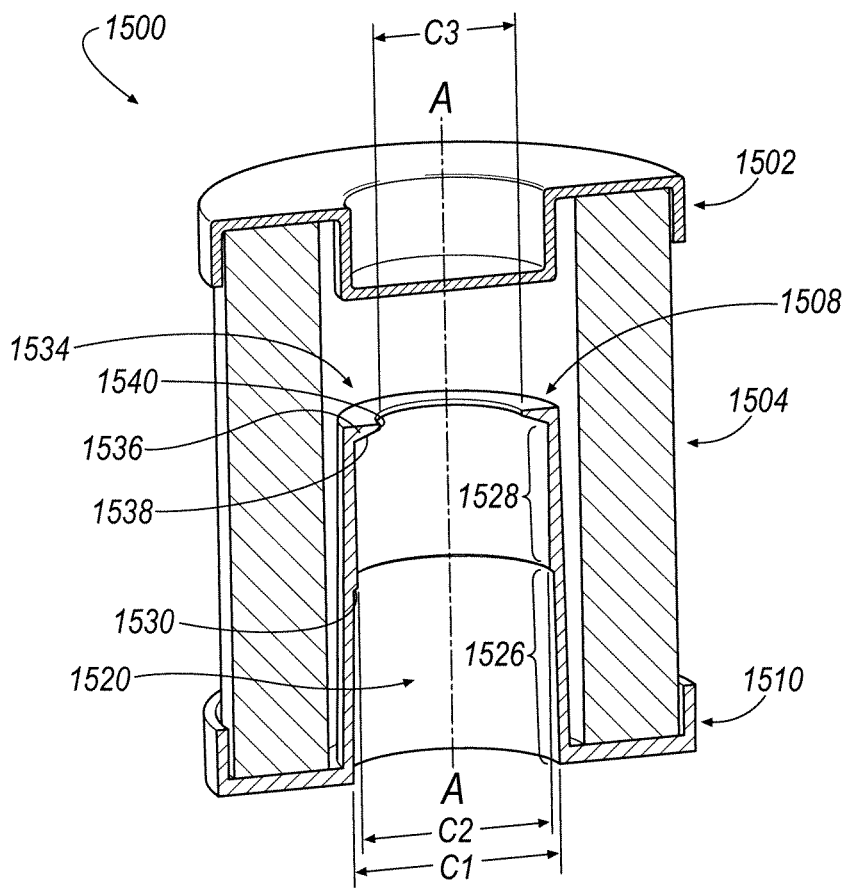
FIG. 20 is an assembled cross-sectional view of the filter element of FIG. 19 taken substantially along line 20-20 in accordance with an exemplary embodiment of the invention.
Figure 21:
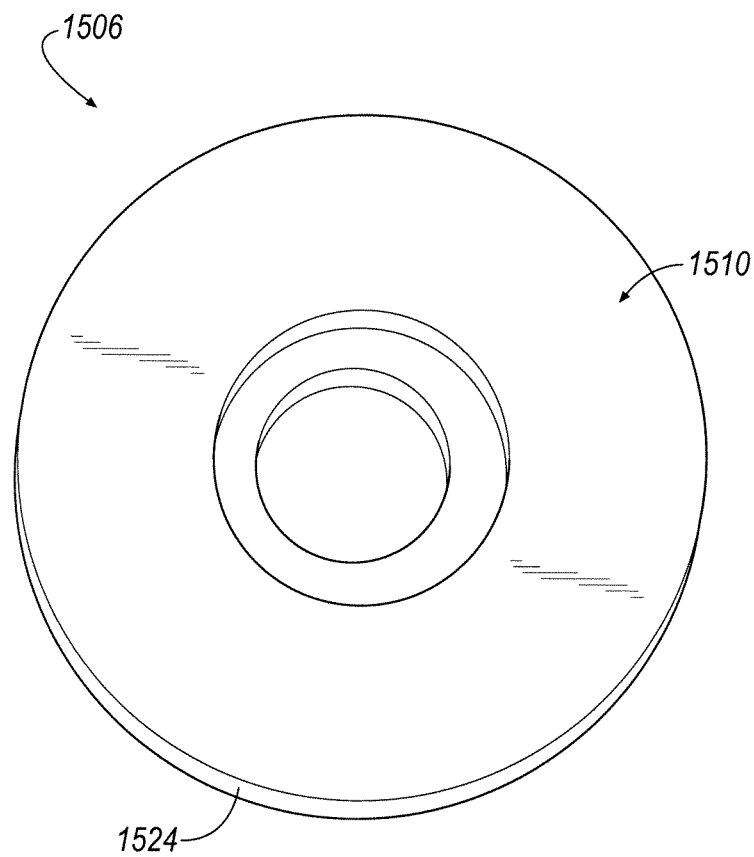
FIG. 21 is a view of an end cap in accordance with an exemplary embodiment of the invention.

According to an embodiment, the filter media 1504 defines an interior volume 1512 that encompasses a central axis, A-A. As seen in FIGS. 19 and 20, the end caps 1502, 1510 support and engage the filter media 1504 in fluid tight relation at a first end 1514 and a second end 1516, respectively, of the filter media 1504 in any desirable manner by using, for example, an adhesive, a potting compound, or the like.

The central tube 1508 may be defined by an outer surface 1518 and an inner surface 1520.

Referring to FIG. 20, in an embodiment, the inner surface 1520 of the central tube 1508 includes a first surface 1526 having a first dimension, C1, and a second surface 1528 having a second dimension, C2. The first and second surfaces 1526, 1528 are demarcated by a shoulder 1530 that projects radially inwardly toward the central axis, A-A. According to an embodiment, the first dimension, C1, is greater than the second dimension, C2. In this embodiment, no key projections, free ends or the like extend from the central tube 1508, to actuate a flow element.

Figure 23:
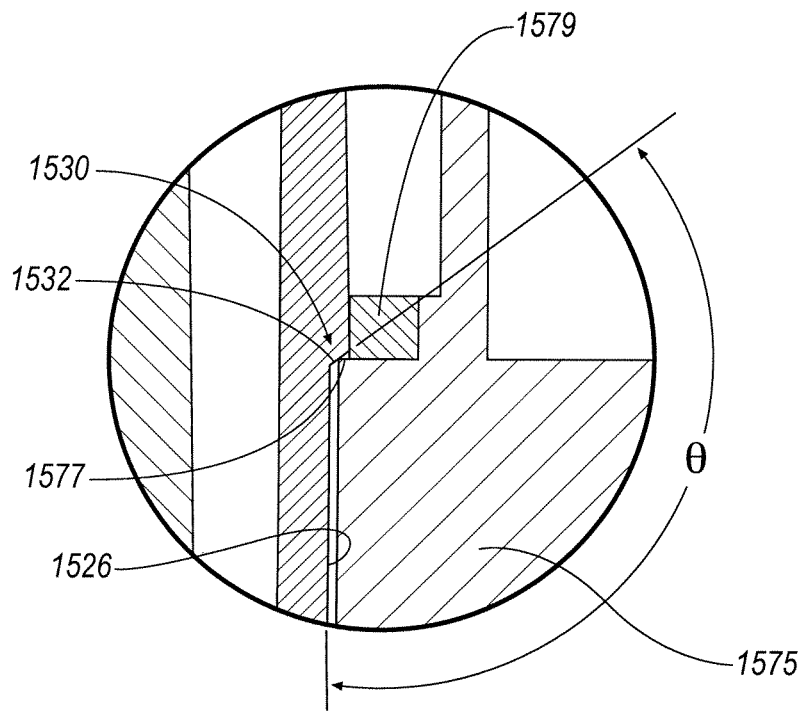
FIG. 23 is a magnified view of FIG. 22 according to line 23 in accordance with an exemplary embodiment of the invention.

In an embodiment, the shoulder portion 1530 includes a shoulder surface 1532 (FIG. 23). In an embodiment, the shoulder surface 1532 is defined by an angle, θ, relative a portion of the first surface 1526. In an embodiment, the angle, θ, is approximately equal to, for example, 135°.

In an embodiment, the central tube 1508 may include a top portion 1534 having a radially extending flange 1536 that projects radially inwardly toward the central axis, A-A. In an embodiment, the radially extending flange 1536 may include a shoulder surface 1538 and a radial surface 1540. In an embodiment, the shoulder surface 1538 is defined by an angle, φ (FIG. 24), relative the second surface portion 1528. In an embodiment, the angle, φ, is approximately equal to, for example, 105°.

In an embodiment, at least a portion of the radial surface 1540 defines opening 1542 in the top portion 1534 of central tube 1508. In an embodiment, the opening 1542 is sized by a third dimension, C3, that is less than the second dimension, C2.

Figure 22:
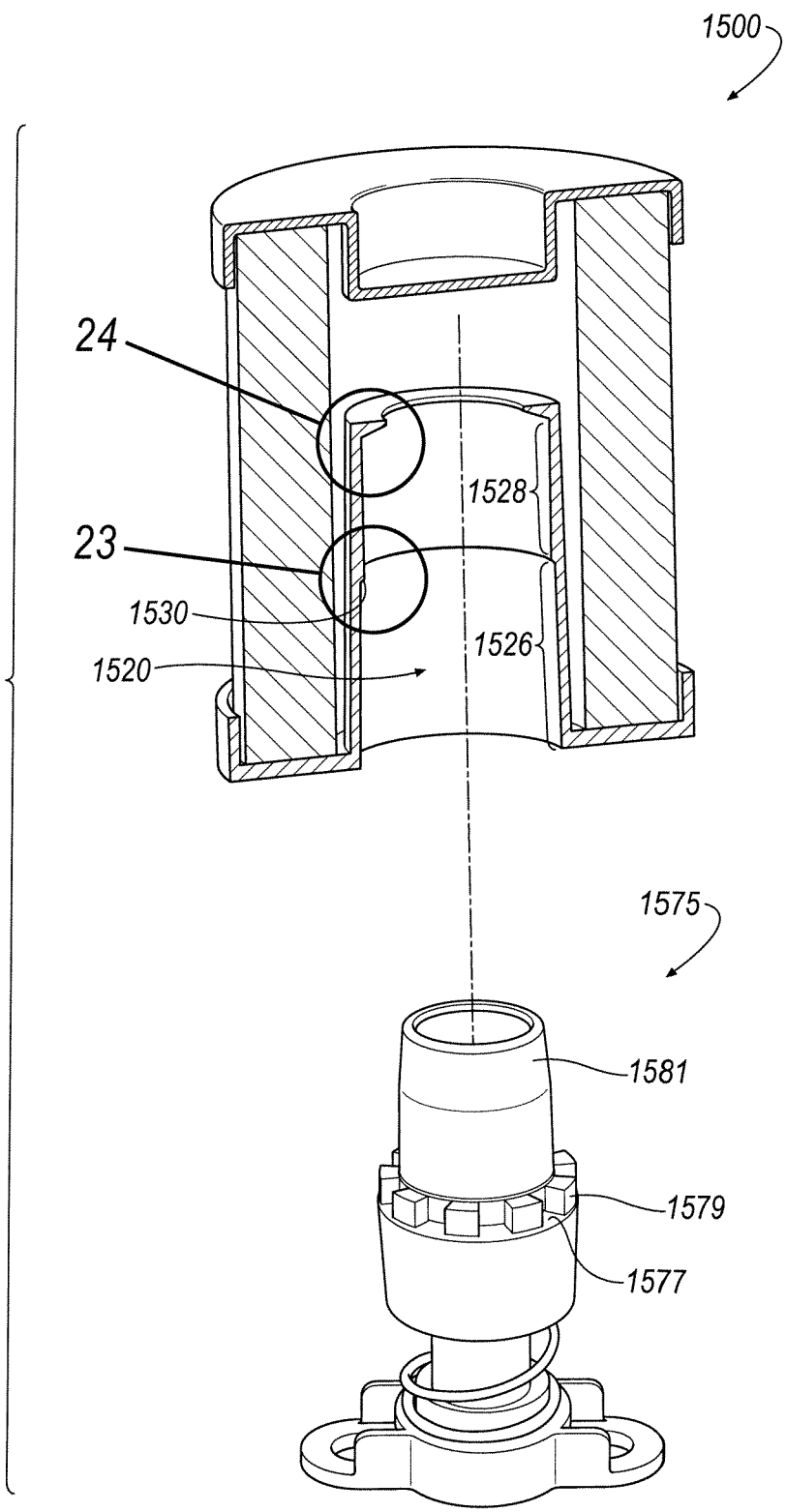
FIG. 22 is an isometric view of a standpipe aligned for insertion into the filter element of FIG. 20 in accordance with an exemplary embodiment of the invention.

Referring to FIGS. 22 and 23, in an embodiment, the inner surface 1520 of the central tube 1508 is sized and shaped to correspondingly receive and seal against a standpipe 1575. According to an embodiment, when the standpipe 1575 is inserted into the central tube, the shoulder portion 1530 contacts a surface portion 1577 of the standpipe 1575. Functionally, the shoulder portion 1530 acts as a projectionless standpipe actuator as the shoulder surface 1532 contacts and engages the axial surface portion 1577 of the valve.

According to an embodiment, the axial surface portion 1577 of the standpipe 1575 may be defined by a top surface portion that defines a plurality of standpipe key sockets 1579 or detents. It will be appreciated that the shoulder portion 1530 is a substantially flat surface having no interruptions, corresponding keys, free ends, or projections formed therein but can still actuate the valve without interaction with the key sockets 1579. Because the shoulder surface 1532 is defined to not include a plurality of keys, free ends, or projections, it will be appreciated that the filter element 1500 may be incorporated for use as a replaceable filter component in a filter assembly having a standpipe 1575 having a plurality of standpipe key sockets 1579 although the filter element 1500 is designed without corresponding keys, free ends, or projections.

Figure 24:
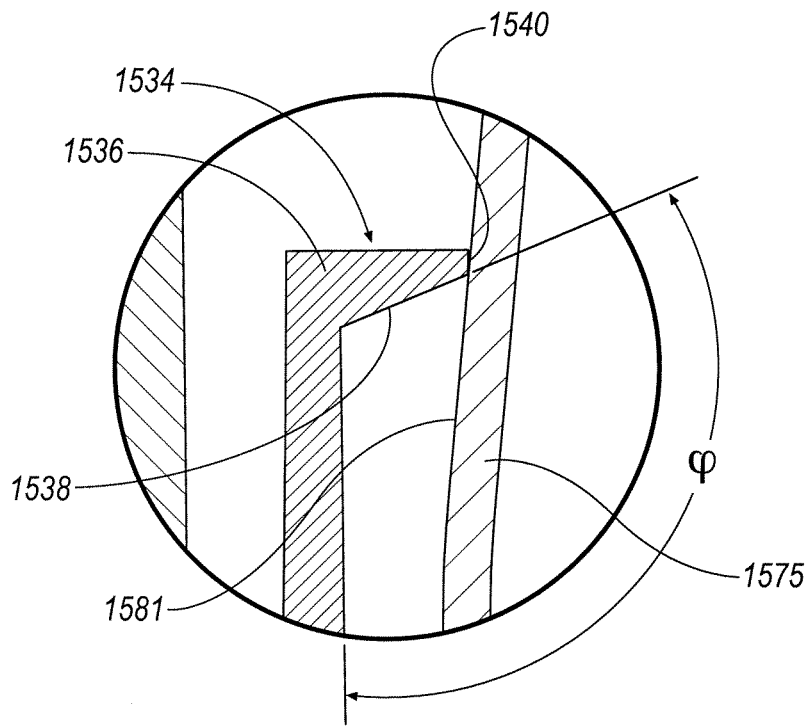
FIG. 24 is a magnified view of FIG. 22 according to line 24 in accordance with an exemplary embodiment of the invention.

With further reference to FIG. 22 and also FIG. 24, in an embodiment, the shoulder surface 1538 abuts a peripheral surface 1581 of the standpipe 1575 upon inserting the standpipe 1575 into the passage 1512. In an embodiment, the radial surface 1540 presses seals against the peripheral radial surface portion 1581.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A filter element comprising:
    an annular filtering media defining first and second axial ends and surrounding an interior area having a central axis;
    a first end cap sealingly attached to said first axial end of said filter media;
    a second annular end cap sealingly attached to said second axial end of said filter media, said second end cap defining a central opening; and
    a central tube having a first end portion extending from the opening of the second end cap and a second end portion, wherein the central tube includes an actuator excluding keys, free ends, or projections, and wherein the second end portion includes a radial flange projecting radially inwardly towards a central axis and circumscribing the second end portion to define an aperture, wherein the central tube includes a first segment, a second segment and an intermediate segment, wherein the first segment has a first segment length, wherein the first segment includes a substantially constant thickness along the first segment length, wherein the second segment has a second segment length, wherein the second segment includes a substantially constant thickness along the second segment length, wherein the second segment extends from the first segment, wherein the intermediate segment has an intermediate segment length, wherein the intermediate segment includes a non-constant thickness along the intermediate segment length, wherein the non-constant thickness of the intermediate segment increases from a first thickness to a second thickness as the intermediate segment extends away from the first segment toward the second segment, wherein the substantially constant thickness of the first segment is approximately equal to the first thickness, wherein the substantially constant thickness of the second segment is approximately equal to the second thickness, wherein the central tube includes an inner surface and an outer surface, wherein the inner surface includes a first surface portion, and a second surface portion, wherein the first and second surface portions are demarcated by a shoulder portion that extends radially inwardly toward the central axis, wherein the radial flange includes a radial surface, wherein the radial surface is adapted to at least partially seal against a standpipe.

2. The filter element according to claim 1, wherein the first segment defines a plurality of radial fluid intake passages.

3. The filter element according to claim 1, wherein the first segment and the second segment are discrete segments.

4. The filter element according to claim 1, wherein the first segment defines a first dimension, wherein the second segment defines a second dimension, wherein the second dimension is less than the first dimension.

5. The filter element according to claim 4, wherein the second segment includes an end and wherein the end includes a plurality of axially extending flexible fingers.

6. The filter element according to claim 5, wherein the end is imperforate.

7. The filter element according to claim 1, wherein the first segment is defined in part by at least one of a substantially cylindrical side wall portion or a conical frustum wall portion.

8. The filter element according to claim 1, wherein the intermediate segment is substantially perpendicular to the first segment and the second segment.

9. The filter element according to claim 1, wherein the first surface portion is defined by a first dimension, wherein the second surface portion is defined by a second dimension, wherein the first dimension is greater than the second dimension.

10. The filter element according to claim 1, wherein the shoulder portion includes a shoulder surface, wherein the shoulder surface defines a standpipe actuator.

11. The filter element according to claim 10, wherein the shoulder surface defines an angle relative the first surface portion, wherein the angle is approximately equal to 135°.

12. The filter element according to claim 1, wherein the shoulder surface is defined by an angle relative the second surface portion, wherein the angle is substantially at or between 90°-120°.

13. A filter element comprising:
    an annular filtering media defining first and second axial ends and surrounding an interior area having a central axis;
    a first end cap sealingly attached to said first axial end of said filter media;
    a second annular end cap sealingly attached to said second axial end of said filter media, said second end cap defining a central opening; and
    a central tube having a first end portion extending from the opening of the second end cap and a second end portion, wherein the central tube includes an actuator excluding keys, free ends, or projections, and wherein the second end portion includes a radial flange projecting radially inwardly towards a central axis and circumscribing the second end portion to define an aperture, wherein the central tube includes a first segment, a second segment and an intermediate segment, wherein the first segment has a first segment length, wherein the first segment forms a substantially constant passage dimension along the first segment length, wherein the second segment has a second segment length, wherein the second segment forms a substantially constant passage dimension along the second segment length, wherein the second segment extends from the first segment, wherein the intermediate segment has an intermediate segment length, wherein the intermediate segment forms a non-constant passage dimension along the intermediate segment length, wherein the non-constant passage dimension formed by the intermediate segment increases from a first passage dimension to a second passage dimension as the intermediate segment extends away from the first segment toward the second segment, wherein the substantially constant passage dimension of the first segment is approximately equal to the first passage dimension, wherein the substantially constant passage dimension of the second segment is approximately equal to the second passage dimension, wherein the central tube includes an inner surface and an outer surface, wherein the inner surface includes a first surface portion, and a second surface portion, wherein the first and second surface portions are demarcated by a shoulder portion that extends radially inwardly toward the central axis, wherein the radial flange includes a radial surface, wherein the radial surface is adapted to at least partially seal against a standpipe.

14. The filter element according to claim 13, wherein the first surface portion is defined by a first dimension, wherein the second surface portion is defined by a second dimension, wherein the first dimension is greater than the second dimension.

15. The filter element according to claim 13, wherein the shoulder portion includes a shoulder surface, wherein the shoulder surface defines a standpipe actuator.

16. The filter element according to claim 15, wherein the shoulder surface defines an angle relative the first surface portion, wherein the angle is approximately equal to 135°.

17. The filter element according to claim 13, wherein the shoulder surface is defined by an angle relative the second surface portion, wherein the angle is substantially at or between 90°-120°.

* * * * *